(12) United States Patent
Mäkelä et al.

(10) Patent No.: US 6,301,338 B1
(45) Date of Patent: *Oct. 9, 2001

(54) ACTIVATION OF A TELEPHONE'S OWN CALL ANSWERING EQUIPMENT ACCORDING TO THE NUMBER OF THE CALLING PARTY

(75) Inventors: Jarmo Mäkelä, Tampere (FI); Jens Jakobsen, Bochum (DE); Antti Jauhiainen, Oulu (FI)

(73) Assignee: Nokia Mobile Phones Ltd., Salo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/779,708

(22) Filed: Jan. 7, 1997

(30) Foreign Application Priority Data

Jan. 8, 1996 (FI) .......................................................... 960075

(51) Int. Cl.[7] ............................ H04M 1/64; H04M 11/00; H04M 3/42
(52) U.S. Cl. ........................ 379/88.21; 379/67.1; 379/76; 379/88.17; 379/93.24; 455/412; 455/414; 455/466
(58) Field of Search .................................. 379/67.1, 88.15, 379/88.11, 90.01, 201, 210, 211, 212, 214, 220, 70, 76, 88.17, 88.19, 88.2, 88.21, 93.09, 93.24, 170, 171, 185, 217, 372, 376; 455/556, 569, 575, 553, 414, 462, 418, 228

(56) References Cited

U.S. PATENT DOCUMENTS

| | | | |
|---|---|---|---|
| 4,481,382 | * 11/1984 | Villa-Real | 455/556 |
| 4,916,726 | 4/1990 | Morley, Jr. et al. | 379/88 |
| 4,942,598 | 7/1990 | Davis | 379/57 |
| 4,985,913 | 1/1991 | Shalom et al. | 379/76 |
| 5,265,145 | * 11/1993 | Lim | 379/88 |
| 5,327,486 | * 7/1994 | Wolff et al. | 379/96 |
| 5,388,150 | 2/1995 | Schneyer et al. | 379/67 |
| 5,434,906 | 7/1995 | Robinson et al. | 379/67 |
| 5,434,908 | * 7/1995 | Klein | 379/88 |
| 5,473,671 | 12/1995 | Partridge, III | 379/59 |
| 5,475,739 | 12/1995 | Norimatsu | 379/70 |
| 5,550,907 | * 8/1996 | Carlsen | 379/207 |
| 5,557,659 | * 9/1996 | Hyde-Thomson | 379/88 |
| 5,559,860 | * 9/1996 | Mizikovsky | 379/58 |
| 5,568,540 | * 10/1996 | Greco et al. | 379/89 |

(List continued on next page.)

FOREIGN PATENT DOCUMENTS

| | | |
|---|---|---|
| 3541898A1 | 6/1987 | (DE) . |
| 0588101 A3 | 3/1994 | (EP) . |
| 2 280 084 | 1/1995 | (GB) . |
| WO 90/03700 | 4/1990 | (WO) . |
| WO 93/26132 | 12/1993 | (WO) . |

OTHER PUBLICATIONS

European Search Report dated Sep. 7, 2000, 2 pages.

*Primary Examiner*—Allan Hoosain
(74) *Attorney, Agent, or Firm*—Perman & Green, LLP

(57) ABSTRACT

In a communication device (20) comprising a message function (SMS, Short Message Service) a certain short message (7) or other reply message is sent in response to an incoming call in a situation where the user can't answer the call him/herself. The reply message can be sent immediately (9) or after a short delay (10, 11), whereby during the delay, the user can choose, whether he/she answers him/herself. The calling party (5) is identified from the CLI information (Caller Line Identity), whereby the reply message can be chosen according to the calling party. Time information can be included in the reply message in order to express at which time by the clock or after a how long time the receiving party is reachable. After that time the automatic reply function based on the reply message is automatically disconnected.

32 Claims, 2 Drawing Sheets

U.S. PATENT DOCUMENTS

| | | | | |
|---|---|---|---|---|
| 5,608,786 | * | 3/1997 | Gordon | 379/100 |
| 5,652,789 | * | 7/1997 | Miner et al. | 379/201 |
| 5,742,905 | * | 4/1998 | Pepe et al. | 455/461 |
| 5,764,731 | * | 6/1998 | Yablon | 379/88 |
| 5,809,415 | * | 9/1998 | Rossman | 455/422 |
| 5,903,832 | * | 5/1999 | Seppanen et al. | 455/414 |
| 6,018,671 | * | 1/2000 | Bremer | 455/567 |

* cited by examiner

ACTIVATION OF A TELEPHONE'S OWN CALL ANSWERING EQUIPMENT ACCORDING TO THE NUMBER OF THE CALLING PARTY

BACKGROUND OF THE INVENTION

The present invention relates in general to message services between telephone devices and in particular to using the number of the calling party for transmitting a message in a situation that the receiving party is busy.

When using a telephone, there is often a situation that the receiving party can't answer the incoming call. In case of wire connected telephones this is in most cases because the user is not in the neighbourhood of his/her telephone. As the radio connected telephones are becoming common, the telephone is more often continuously carried along by the user, but for example in the middle of a meeting it is not possible to answer it without disturbing the course of the meeting. As a known solution in those situations there is used a call answering machine that can be a separate device bought by the user or can be located at a telephone exchange apparatus operated by a company or a teleoperator. Typical of call answering machines is that they reproduce a short prerecorded notice to the calling party and after that give the calling party an opportunity to leave a message that will be stored into the answering machine and can be played back later by the receiving party.

In certain situations the receiving party can, however, wish that different callers would be served in different ways when he/she is not able to answer him/herself. If the receiving party is, for example, having a long lunch with his fellow employees, it is to be recommended that the reply message informs, when his wife is calling, that he is attending an important work meeting. But if the caller is his own boss, the explanation of having a meeting won't work but the answering equipment should inform that the receiving party is "on business". Another situation requiring a different treatment according to the calling party is a prolonged meeting, after which the receiving party has appointed another meeting. In that case the person with whom the latter appointment has been made can call and wonder what's keeping him/her. The answering equipment should be able to tell him/her, how long the meeting is still going to last. Calls from other callers can be ignored or they can be routed to a usual reply service, because the ending time of the meeting does not make any difference to them.

The present mobile phones have, almost without exception, a display, by means of which the receiving party, when the telephone rings, can see the telephone number of the calling party connected to a digital exchange. In fast situations it is preferable that the receiving party can still at that moment decide, which kind of a reply service will be applied to the calling party in question.

Known from the patent publication EP-588, 101 (Goldman & Wu, ROLM Company) there is a procedure, where the number identification of the calling party is used. This function is known in the art and called ANI (Automatic Number Identification) or CLI (Caller Line Identity). In the solution proposed by the reference publication, the telephone number of the calling party or a corresponding identity code is transmitted through the telephone network to that exchange apparatus, where the telephone reply service of the receiving party is operating. The receiving user has beforehand entered to the reply service as key commands a list of those telephone numbers for which he/she wishes to have a special treatment. When a call is coming, the ANI code transferred with the call is compared by the apparatus to the list of the stored numbers and if the number is on the list, certain special services are offered to the calling party. The publication proposes, e.g., that the message given by this caller can receive a priority treatment according to which this message will be played back prior to others when the receiver starts to playback the answering equipment. Alternatively, the answering equipment can reproduce a different message for those calling parties, the numbers of which are on the list. Further, a function is proposed, according to which the receiving user can afterwards initiate a callback to those persons who are on the list and have called the answering equipment, by depressing a single key.

The method proposed by the reference publication has, however, drawbacks associated with the call answering equipment itself. As the exchange apparatus, in view of billing, treats the activation of the call answering equipment in the same way as the usual answering of the call, the calling party must pay at least a local call charge, although he/she is connected only to the answering equipment. Especially for those who are calling from a slot machine this is often infuriating. The operation of a call answering equipment requires a two-way connection, ie. transmission of speech in both directions in the network, by which the network capacity is reserved. Also storing of voice messages takes a lot of memory space in digital systems. Further, a call answering machine located in the exchange requires for remote using through a terminal device that the receiving party gets in advance into a telecommunication with the exchange and gives a group of key commands, that can be difficult to know by heart. Also, these commands can't be given when the telephone is already alarming for an incoming call, so that it is not possible to react in fast situations according to the number of the calling party, but only to decide whether the call will be answered by oneself or given to the reply service.

Known from the publication "Ericsson Review", p. 145, No. 4, Stockholm 1988 there is an exchange apparatus BCS 150, the telephone answering function of which can give instead of a voice reply a text message, if the telephone device of the calling party is equipped with suitable receiver and display means for producing text messages. In that case there is no need to reserve a telephone line for a two-way speech connection. In addition, the calling party can leave to the exchange an automatic callback request that does not reserve as much memory as a voice message to be stored. The apparatus is, however, still used by the exchange, whereby the controlling of the telephone reply service must be performed in advance, for which the receiving party is required to know the key commands. In addition, the receiving party has no other way to express through the call answering equipment some certain term but by storing a new reply message concerning the term in question.

Known from the patent publication WO-90/03700 there is much the same kind of an exchange apparatus, where the reply message can be in voice or text form. There the messages sent by a calling party are stored into a memory of a computer, whereby, in case they are in text form, they can be transmitted through the display of the receiving party or printed on paper by a printer. Also this system is used by the exchange and has no services concerning any fixed time limits.

Known from the patent publication EP-564,756 there is a selective answering station that based on the identity code of the caller checks if the calling party is on a certain list of acceptable callers. If not, the call is not answered. If the identity code of the calling party is on the list, the answering station decides, which of the receiving parties connected thereto will take the call. Also, certain calling parties can receive a priority treatment so that the calls given by these calling parties will be connected prior to other calls. No telephone reply service changing according to the number of the calling party and no fixed-term mechanisms are described in this publication.

SUMMARY OF THE INVENTION

An object of the present invention is to provide a method and an apparatus, by means of which the telephone answering function can be adapted to operate in different ways according to the number of the calling party and the use of which for the mentioned purpose is simple and flexible. An object of the present invention is also to provide a method and an apparatus, by means of which the messages to be given by the reply service can be tied up with certain fixed terms.

The objects of the invention will be achieved by accomplishing the incoming-call related calling number identification in the telephone device that is receiving the call, and by giving the telephone user the possibility to choose a different replying function on the basis of the identified calling number. To achieve the object concerning fixed time limits, a clock-time part will be attached to the reply.

The method in accordance with the present invention for answering a call coming to a communication device in a situation where the user of the communication device can't answer the call him/herself is characterized in that in response to the incoming call, the communication device identifies the caller on the basis of an identification information included within the incoming call and sends a reply according to a selection made by the user, or directs the incoming call to another aswering service, said reply being one of the following: a voice message, an e-mail message, a facsimile, an SMS message in the form of a character string.

The present invention also concerns a communication device characterized in that it comprises means for identifying the caller on the basis of an identification information included within the incoming call and for sending, according to a selection made by the user, a reply in response to the call, said reply being one of the following: a voice message, an e-mail message, a facsimile, an SMS message in the form of a character string.

The drawbacks of the prior art programmable answering services are mainly a consequence of the fact that the asnwering function has been implemented wholly in a telephone exchange or comparable equipment. This is understandable, because the prior art telephone devices have not given the opportunity to realize very complicated aswering functions in the user's own telephone device. According to the present invention one may use the telephone's own functions instead of or in addition to those of the telephone exchange or a separate auxiliary device, whereby the calling number identification and the reaction based thereon are preferably implemented in the user's telephone device. The user may him/herself make the decision, according to the incoming call, how he/she will answer to it; for example, should the voice mail service of the network take care of answering or should the Short Message Service (SMS) feature of the telephone be utilized, whereby the short message to be sent in response to a call given by a certain calling party is chosen based on the identification of the calling party. Short message refers in this patent application to data transfer determined by certain telephone systems in the form of a character string, wherein no actual telephone connection is required to be formed but it is transferred as a so called signalling. Transmission of a short message can be effected automatically or through a key command and it can be effected immediately after the call has come or with a short delay, so that the receiving party can choose between different alternative functions after having seen the telephone number of the calling party on the display of the telephone. In addition to or instead of sending a short message, the call can be routed to a usual call answering machine, so that the calling party has the opportunity to leave a voice message or some other message. Also this routing can be based on the identification of the calling party.

For implementing the fixed terms, a clock-time can be included in the messages, especially short messages, according to the invention to be sent as answers, to tell when the receiving party will be reachable next time. The clock-time included in the short message can be tied up with the real time clock of the device or to some other timer means, so that the device decreases automatically the time left. For example, the first caller can get in reply a short message "I'll be still 20 minutes in a meeting" and a call coming five minutes later will be answered "I'll be still 15 minutes in a meeting". After expiration of the given time, the short message reply can be disconnected automatically, so that the user does not have to take care of removing the function. If the communication device of the receiving party is at the same time a pocket computer including a calendar program, the electronic markings made thereto can be used as a basis for timing the messages. Then the message can be e.g. "I'll be in a meeting from 14 to 16 o'clock".

As one of the special advantages of the invention can be considered the fact that for storing for example a short message as an answering message only a little of memory space is required, so that it does not burden unreasonably the capacity of the user's terminal device. Additionally, the use of the method in accordance with the invention is soundless, whereby the eventually ongoing meeting will not be disturbed. Further, it is more simple to store the messages into one's own terminal device by means of a menu controlled user interface preferably included therein, compared with the remote control of a telephone answering system located in the exchange apparatus, and accordingly, a standard message can be kept in the exchange apparatus and a message changing in accordance with each situation can be kept in one's own terminal device. As the method and apparatus in accordance with the invention does not require any additional requirements or limitations to the operation of an exchange, they can be flexibly attached along with existing, exchange-used systems.

BRIEF DESCRIPTION OF THE DRAWING

The present invention will now be described in more detail with reference to the exemplified preferred embodiments and accompanying drawings, wherein.

In figures the corresponding parts are identified with the same reference numbers.

DETAILED DESCRIPTION OF THE INVENTION

Figure 1:
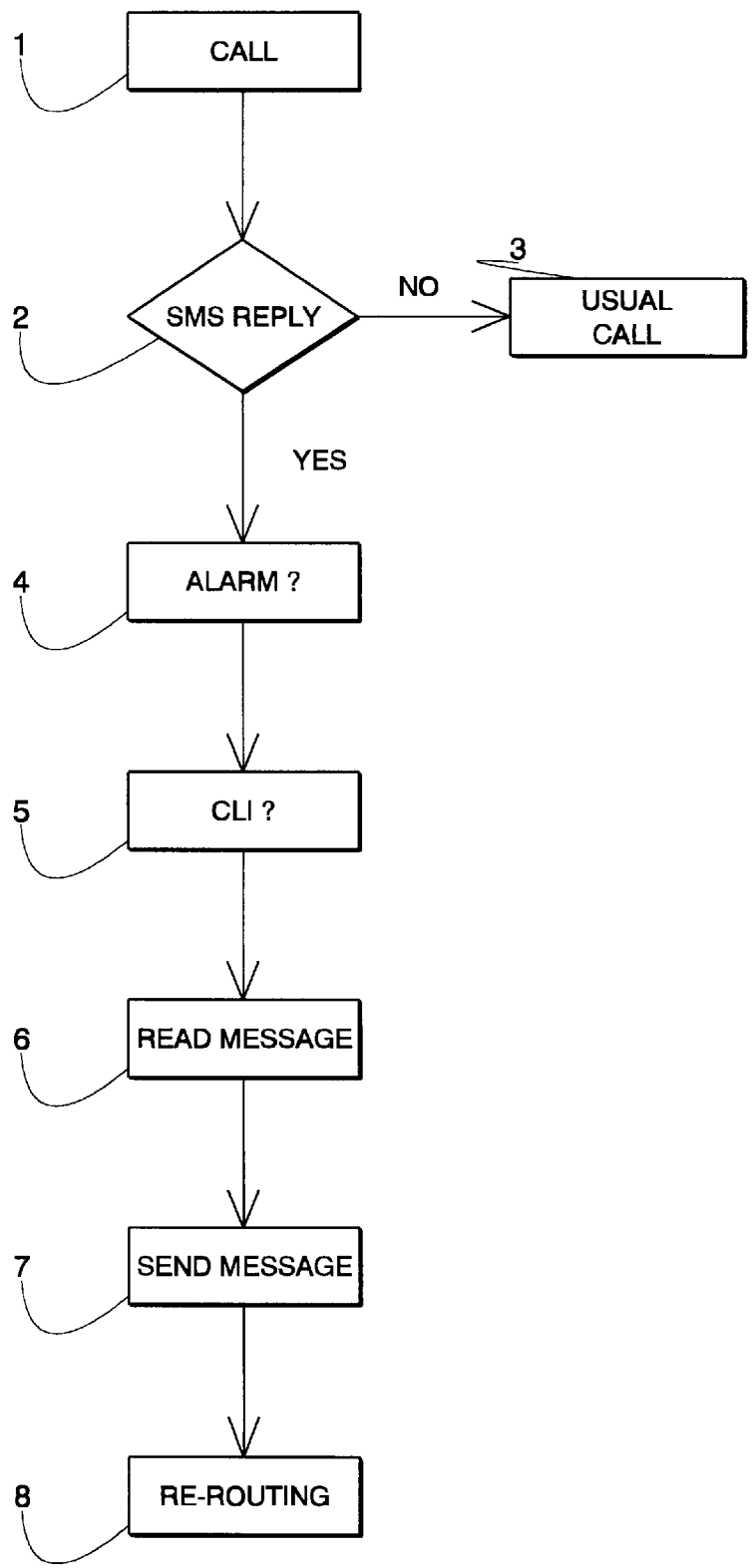
FIG. 1 illustrates as a simple flow diagram a preferable embodiment of the method in accordance with the invention.

In FIG. 1 there is a flow diagram of a function according to one simple embodiment of the invention in a mobile communication device comprising the short message function. The operation starts from point 1, where an incoming call is noticed. The apparatus checks according to point 2 if the reply service employing the short message service (SMS Reply) is switched on. If not, it moves to point 3 corresponding the treatment of the call in a usual and known way. When the service is switched on, the apparatus then checks in point 4 which kind of an alarm procedure is applied to and in point 5 if the identity code of the caller (CLI, Caller Line Identity) is available. The latter is required for sending a short message. In point 6, the apparatus reads from the memory the short message stored therein and if it includes a time-dependent part, it counts the required time information. In point 7, the message is sent to the calling party, supposing that the communication device of the calling party has the short message function. In order to check this, it is possible to judge e.g. from the telephone number included in the CLI information of the calling party, if the calling party has a GSM telephone. In point 8 the call can further be routed to a normal call answering machine that can be in connection with the same mobile communication device or some exchange apparatus.

Figure 2:
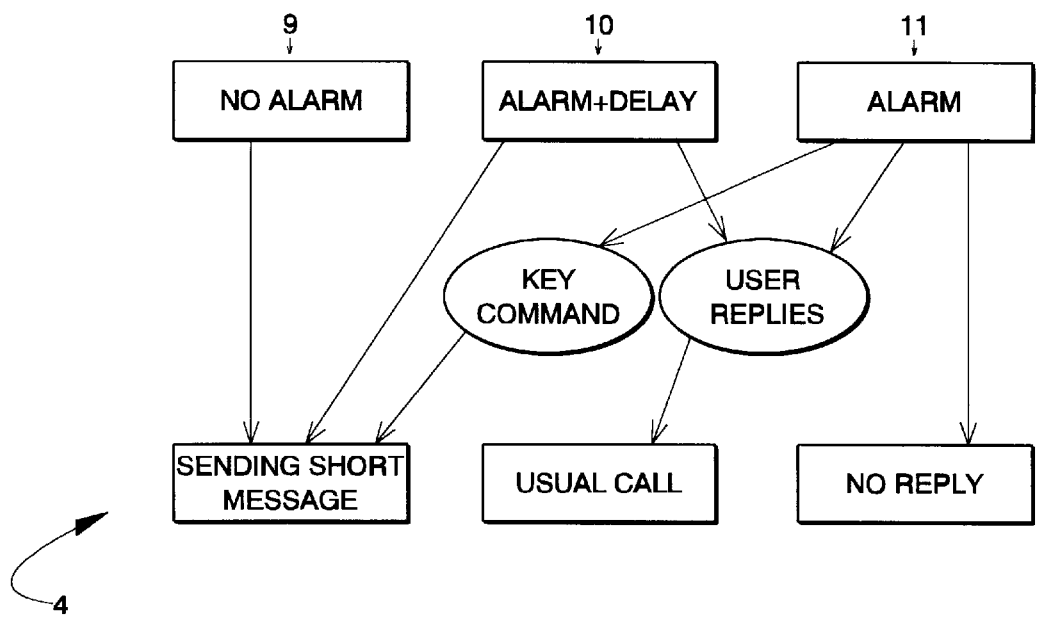
FIG. 2 shows a detail of FIG. 1.

In FIG. 2 there is described in more detail one preferred embodiment of point 4, that has three different alternatives according to the alarm function that the user has selected. The first alternative 9 is transmitting a short message as a reply immediately without an alarm or other signal to the receiving party. In the second alternative 10 the apparatus gives an alarm that can be, in the way known in the art, a sound alarm or a soundless alarm, and waits after that for a moment, so that the user can choose whether he/she answers the call in a normal way or not. If the user does not answer, a short message will be sent. In the third alternative 11 the apparatus gives a sound or a soundless alarm, whereby the user can answer the call normally or give a certain key command that means sending a short message. In the last mentioned case there can be several key commands each of them corresponding a different short message. The operation alternative 11 has the advantage that if there are certain standard messages stored into the memory of the device, it is applicable, even if the user has not taken any preliminary measures in order to take the reply service employing short messages into use.

Even more generally, the short messages used in reply to incoming calls can be standard messages stored into the device in connection with manufacturing or programming or the user can write his/her own messages him/herself. There are several procedures known in prior art, by which messages consisting of letters can be written by means of a numerical keypad of a usual mobile phone. If a special alphabetic keypad is included in the mobile station, the writing of messages is still easier.

The identity code of the calling party read in point 5 can be used in many ways. The user can e.g. program his/her device in advance so that it sends a short message only in reply to the calls of certain, separately named callers, whereby the others are not answered with the short message, or that it does not send the short message to certain named callers. There can also be several short message replies, whereby the caller determines in advance, which message is sent to each calling party. The choices can be based e.g. on a system that internal calls of the own company are separately identified or that it is judged from the country code of the telephone number of the calling party, which country the call is coming from, so that the short message can be sent in the language of the country in question. By comparing the country code to a certain data base, it can also be judged, what is the time in the position of the calling party, whereby a part applying to time zone can be attached to the short message. The user can also have simply named certain telephone numbers, the calls coming from which are answered with certain short messages. The marking can be based on an electronic notebook already included in the communication device or a short message notebook or a list available to the reply service especially employing the short messages.

If the telephone number of the calling party refers to some record of the notebook integrated to the device, where, in addition to the telephone number, also the subscriber's name of the number is stored into, the short message to be sent as a reply can be personified by attaching the name in question to it, so that the message is e.g.: "Hello Anne, I'm in a meeting, call again in 20 minutes". If the number of the calling party has been read as CLI data but the corresponding number has not been stored earlier to any notebook, it can be automatically stored. At the same time the device can store into its memory means an automatic reminder asking after a certain time the user to call the number in question. If the same caller calls again, the short message to be given in reply can be changed to a different one. If no identity data of the calling party is available, there can be sent a message asking the calling party to enter his/her telephone number, whereby the corresponding DTMF signals (Dual Tone MultiFrequency) are transmitted to the device of the receiving party where they can be interpreted and registered.

As mentioned above, a clock-time part can be attached to the short message to be sent in reply, in order to express the time by which the receiving party will be reachable again. In regard to the time by the clock, there are two principle alternatives: the message can include a fixed time by the clock, saved as a part of the message or read by the communication device of the user from a calendar program included therein, or the device can specify the time information separately for each incoming call based on a counter clock. The first alternative has the drawback that a caller calling from a different country is not necessarily aware, if the short message emerging in his/her telephone "Call again at 16 o'clock" means the time of the target country or the local time. The latter alternative is found to be the best of these two. There the user has entered the starting time of the meeting and its figured duration into his/her device in advance, or only the figured time by which he/she will be free again. The device can also read the above mentioned information from a calendar program. When a call comes into the device, the device checks itself how long time is left until the receiver will be free and formulates the short message e.g. into the form "Call again in 20 minutes". In both of the time alternatives an automatic quitting procedure is applicable, according to which the reply function is automatically disconnected when the time limit has expired.

Figure 3:
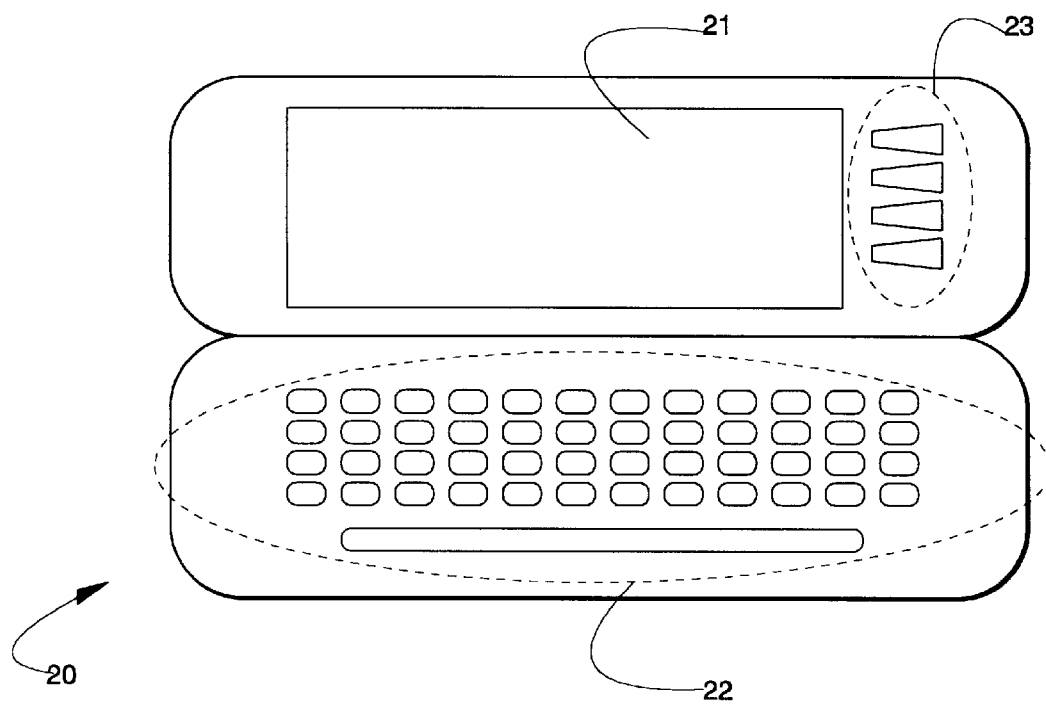
FIG. 3 illustrates an exemplified communication device, where the method according to the invention is applicable.

In the following, the method in accordance with the present invention will be described from the user's point of view, with reference to a communication device according to FIG. 3. This kind of a communication device is described e.g. in the Finnish patent application no. 955,682 "Double-acting Communication Device", which at the filing date of the present application is not public. It concerns a mobile communication device comprising substantially two separate user interfaces, the first user interface being a telephone user interface like present mobile phones located on the outer surface of the device. The second user interface comprises a larger display and an alphanumeric keypad for using of which the outer covering of the telephone will be opened. The data transfer is implemented, like with present digital mobile phones, in a cellular radio network. FIG. 3 shows from the communication device 20 especially the second user interface comprising a display 21 and a keypad 22 and function keys 23 located beside the display, to be used for choosing those functions and alternatives, the codes of which are on the display 21 by certain function keys 23 respectively.

It is assumed that the second user interface of the communication device 20 has a procedure for starting certain application programs. The user chooses among the application programs a program called SMS Reply Mode (Short message reply mode) and starts using it by depressing a certain Select key. The so called main window of the SMS Reply Mode will be displayed in the display 21, said window including, among others, by the function keys 23 a list of available function alternatives e.g. in the following form Set On
Predefined Messages
Options
Close.

The user can now write the desired reply message through the keypad 22. The message will be displayed in the message region of the display 21 reserved to it and the writing will be ended by depressing the function key at the alternative "Set On", whereby the device 20 stores the message into a certain short message register (not shown in the figures). Finally, the user depresses the function key at the alternative "Close", whereby the device returns to the basic mode. The reply service using the short message is thus switched on.

When the user wants to disconnect the short message reply, he/she chooses again the program SMS Reply Mode. A list of available function alternatives will be displayed in the display 21 by the function keys 23, the alternatives being now Set Off
Predefined Messages
Options
Close.

The user depresses function keys "Set Off" and "Close" one after the other, whereby the short message reply mode is switched off and the device returns to the basic mode.

If the user depresses the function key "Predefined Messages", the display 21 shows a list of ready messages that can include general notices and the following function alternatives Select
Add
Delete
Cancel By a certain ready message there is some selection mark, that the user can move from one message to another by depressing a certain key which is preferably an arrow key (not separately shown in the figure). By depressing the "Select" key the user selects the message in question that will be copied onto the message region of the main window, where it can further be edited. Through the function keys "Add" and "Delete" the user can add and delete ready messages. By using the function key "Cancel" this window will be closed without copying any of the ready messages onto the message region of the main window.

The alternative "Options" means a mode where the user can, in a more varied way than what has been described above, affect the operation of the application program controlling the short message reply mode. By depressing the function key "Options" in the main window, the user gets onto the display 21 instructions e.g. concerning the use of the time information and the automatic disconnecting of the short message reply mode described above. In the mode Options the user can also make choices concerning the use of the CLI information expressing different calling parties for controlling the reply service.

The operation modes and alternatives emerging onto the display described above are meant as examples only, without limiting the invention. In the future it is e.g. possible, that the speech identification technique will be so much developed that the control of the whole operation can be implemented through speech commands. Additionally, the above described function can be implemented also in a usual mobile phone without an extended keypad and display user interface according to FIG. 3. In that case, different alphabetic and control functions are attached to the numeric and other keys of the mobile phone in the way known in the art.

Means in the mobile communication devices for transferring short messages are known in prior art. A communication device in accordance with the invention further comprises display and data entering means for implementing the above described operation measures, which means are also usual in present mobile phones. Additionally, the communication device in accordance with the invention must have means for controlling the operation. They are preferably implemented as software processes that are stored to the memory means included in the communication device in a form to be performed by the microprocessor controlling its operation.

The description above concentrates—for the sake of demonstrational clarity—on the use of SMS messages as answers. The invention is, however, not limited to SMS messages, but the answer may, according to other embodiments of the invention, be also a e-mail message or a facsimile, if the user's communication device is capable of associating the caller to a certain e-mail address or facsimile number by using the telephone directory information stored in its memory. The answer may also be a voice message, if the user's communication device is capable of storing a voice message into its memory, from which it may reproduce it as an answer to an incoming call. The user selects from his/her communication device, which answering service he/she wants to offer to each identified caller.

An advantage of using a locally stored voice message as an answer to an incoming call according to the invention is that the caller momentarily reacts as if the receiving party had answered him/herself. That is, the caller does not for example hang up immediately when he/she perceives the answer, as could be the case if an SMS message would be sent as an answer together with an electronic answering tune. We may suppose that the receiving party is attending a lecture, where speaking is not permitted, and he/she wants the calling party to wait, without hanging up, until the receiving party has got out of the lecture room and reached the lounge where he/she may speak freely. According to a preferable embodiment of the method of the invention, the receiving party detects the incoming call through a silent alarm of his/her telephone, optionally also sees from the display who is calling, gives a key command that causes the telephone to send a voice message "Please wait for a moment, I'll be back after a short while" and walks quietly out of the room to be able to speak to the phone. This method also works in the middle of a telephone conversation, if one of the parties must have a short break for some reason. The invention is thus not limited to sending a message in the immediate beginning of a call.

The voice message option is also easily adapted to the previously explained principle of composing the answer message from different parts, even "online", to include for example a piece of time information. An example of composing a voice message "online" is the following. The receiving party has previously stored to the memory of his/her telephone the voice message equivalents of the phrase "I'll be back" and some time periods, like "in 30 minutes", "after one hour" or "tomorrow". There are separate key commands that correspond to the sending of each of these previously stored voice messages. When the telephone indicates that a call is coming, the receiving party may give a first key command, that causes the telephone to answer the call by sending a voice message "I'll be back", and a second key command like pressing the keys "3" and "0" in succession, whereby the resulting voice message that the caller hears is: "I'll be back . . . in 30 minutes".

The messages that the telephone apparatus is able to send to the other party of a telephone call may be interconnected so that the contents of the message is the same regardless of the form in which it is sent. This is most easily realised by including into the telephone apparatus a voice synthesizer, which is able to transform text messages into voice messages. This kind of synthesizers are well known in speech-related computer technology. It is very convenient for the user of the apparatus to create, store and edit the messages in text form, and whenever a voice message is needed, the voice synthesizer transforms the respective text message into audible form.

The method of sending messages as answers according to the invention also works together with the so-called knocking feature, which means that a third party placing a call to a receiving party who is already having a telephone conversation with someone else causes the receiving party to hear a short "knocking tune" in the middle of the ongoing conversation to inform him/her that another call is coming. The receiving party may, according to the invention, give a simple key command that sends the knocking caller an answering message like "I'm busy, please wait for . . . one minute" or any other message that has been described above. This answer may be a previously selected standard answer to all knocking parties, or the receiving party may select the most proper answer message at the very moment. If the CLI information is present in the knocking call, the selection of an answer may be based on the identification of the knocking party, either automatically or through displaying the knocking caller's identification to the receiving party in the telephone's display.

Different features of the reply function are described above as separate parts. For a person skilled in the art it is, however, obvious that these features can be interconnected in many ways within the scope of the claims presented further on. Even though it has been referred above to a calling party, call and receiving party in the sense meaning a normal telephone connected speech contact, the reply function in accordance with the present invention is applicable to all connections between such communication devices where the short message communication or other messaging function according to the invention can be used. The invention is especially applicable to mobile communication devices of digital cellular networks like GSM telephones.

What is claimed is:

1. A method for replying to a call coming to a portable terminal in a situation where the user of the portable terminal can't answer the call, wherein in response to the incoming call, the portable terminal identifies the caller on the basis of an identification information included within the incoming call and sends a reply according to a selection made by the user, or directs the incoming call to another answering service, said reply being one of the following: a voice message, an e-mail message, a facsimile, an SMS message in the form of a character string, and wherein said step of identifying the caller is accomplished by said portable terminal, and said step of sending a reply is accomplished by said portable terminal, said portable terminal being capable of performing said step of sending a reply by providing a selected response to said caller exclusively through the action of said portable terminal.

2. A method in accordance with claim 1, wherein the portable terminal sends said reply immediately in response to an incoming call.

3. A method in accordance with claim 2, wherein the portable terminal routes said call additionally to a usual call answering machine.

4. A method in accordance with claim 1, wherein in response to an incoming call, the portable terminal alarms and waits during a certain predefined delay, and if the user during said delay does not answer said call, the portable terminal sends said reply.

5. A method in accordance with claim 4, wherein the portable terminal gives a soundless alarm.

6. A method in accordance with claim 1, wherein in response to an incoming call, the portable terminal alarms, and if the user gives a certain key command, the portable terminal sends said reply, wherein, by said key command, the user of the portable terminal selects a mode of transmission of said reply from anyone of a set of modes including short message service, electronic mail, facsimile, and voice message.

7. A method in accordance with claim 1, wherein said reply is at least partly formulated based on the identification of the calling party.

8. A method in accordance with claim 7 wherein a reply is sent to certain identified calling parties only.

9. A method in accordance with claim 7, wherein the reply to be sent in response to the incoming call is different according to the respective company said call is coming from.

10. A method in accordance with claim 7, wherein the reply to be sent in response to the incoming call is different according to the respective country said call is coming from.

11. A method in accordance with claim 7, wherein the reply to be sent in response to the incoming call is different according to the respective time zone said call is coming from.

12. A method in accordance with claim 7, wherein said identification of the calling party is based on a telephone notebook comprised by the portable terminal.

13. A method in accordance with claim 12, wherein a piece of information applying to calling party, read from said telephone notebook, is included in said reply.

14. A method in accordance with claims 7, wherein a reminder to call the identified calling party will be stored into the portable terminal, in order to be presented to the user later.

15. A method in accordance claim 1, wherein said reply includes time information.

16. A method in accordance with claim 15, wherein said time information comprises a reference to a certain fixed time by the clock.

17. A method in accordance with claim 15, wherein said time information comprises the length of the time that is left from incoming of the call to a certain fixed time by the clock.

18. A method in accordance with claim 15, wherein when the user has entered information concerning his/her time schedule into the portable terminal, the portable terminal forms said time information automatically by reading from said time schedule information the time when the user will be reachable.

19. A method in accordance with claim 15, wherein when the time until the time expressed by said time information has expired, the function controlling the sending of replies in the portable terminal in response to an incoming call is automatically disconnected.

20. A method in accordance with claim 1 wherein, in said step, performed by the portable terminal, of identifying the caller on the basis of information included within the incoming call, the portable terminal responds to components of the number of the calling party as presented in a caller identification.

21. A portable terminal for replying to an incoming call in a situation where the user of the portable terminal can't reply the call, wherein said portable terminal comprises means for identifying the caller on the basis of an identification information included within the incoming call, and means for sending, according to a selection made by the user, a reply in response to the call, said reply being one of the following: a voice message, an e-mail message, a facsimile, an SMS message in the form of a character string, and wherein said means for sending a reply is capable of sending said reply by providing a selected response to said caller exclusively through the action of said portable terminal.

22. A portable terminal in accordance with claim 21, wherein it comprises a real time clock and means for including time information in said voice message, e-mail message, facsimile, or SMS message.

23. A method in accordance with claim 1 comprising a further step of the user selecting a mode of the reply subsequent to receipt of the incoming call to effect said user selection of the reply after receipt of the incoming call.

24. A portable terminal in accordance with claim 21, wherein it comprises a downwards counting timer for expressing the length of the time that is left from a certain predefined time period, and means for attaching the information expressed by said timer to said voice message, e-mail message, facsimile, or SMS message.

25. A portable terminal in accordance with claim 21 further comprising means enabling the user to select a mode of the reply subsequent to receipt of the incoming call to effect said user selection of the reply after receipt of the incoming call, wherein the selection enabling means is operative in response to a key command as an input from the user of the portable terminal for selection of a mode of transmission of said reply from anyone of a set of modes including short message service, electronic mail facsimile, and voice message.

26. A portable terminal in accordance with claim 21 wherein, in said means for identifying the caller on the basis of information included within the incoming call, said identifying means responds to components of the number of the calling party as presented in a caller identification.

27. A method for replying to a call coming to a portable terminal in a situation wherein the user of the portable terminal does not answer the call, the method comprising the steps of:

in response to the incoming call, the portable terminal identifies the caller on the basis of an identification information included within the incoming call and sends a reply according to a selection made by the user, or directs the incoming call to another answering service, said reply being in a mode of response including one of the following modes of response: a voice message, an e-mail message, a facsimile, and an SMS message in the form of a character string;

wherein said step of identifying the caller is accomplished by said portable terminal, and said step of sending a reply is accomplished by said portable terminal;

wherein said selection made by the user includes a step of entering a response by the user and a step of selecting one of said modes of response.

28. A method according to claim 27 wherein said step of entering a response includes generating a response.

29. A method according to claim 27 wherein said step of entering a response includes designating a previously stored response.

30. A method according to claim 27 wherein said portable terminal is capable of performing said step of sending a reply by providing a selected response to said caller exclusively through the action of said portable terminal.

31. A communication device for replying to an incoming call in a situation wherein the user of the communication device does not reply to the call, wherein said communication device comprises means for identifynig the caller on the basis of an identification information included within the incoming call, and reply means for sending, according to a selection made by the user, a reply in response to the call, said reply being one of the following modes of response: a voice message, an e-mail message, a facsimile, and an SMS message in the form of a character string;

wherein said reply means is capable of sending said reply by providing a selected response to said caller, said reply means including a data entry device for generating a response and a selector of a previously stored response.

32. A communication device according to claim 31 wherein said reply means is operative to provide said selected response exclusively through the action of said portable terminal.

* * * * *